March 15, 1966   J. F. ZIEVERS ETAL   3,240,347
FILTER APPARATUS
Filed Jan. 22, 1962   2 Sheets-Sheet 1
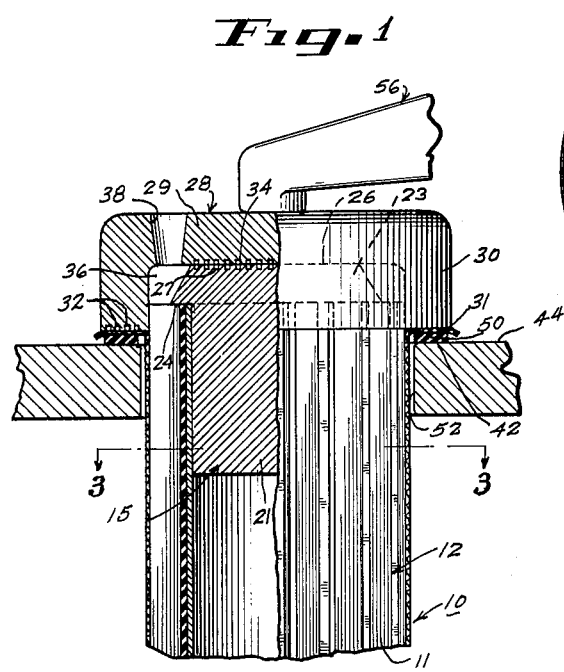
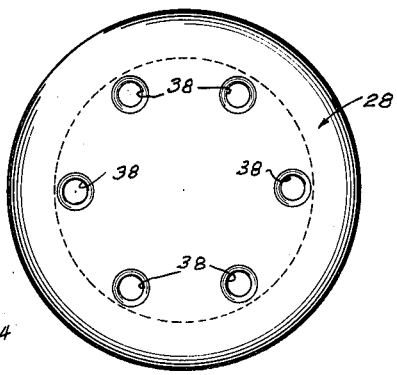
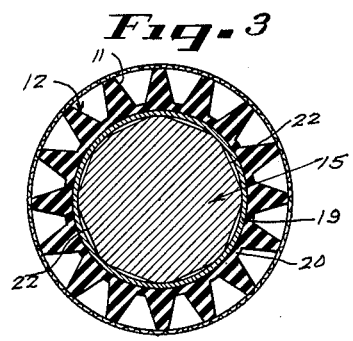
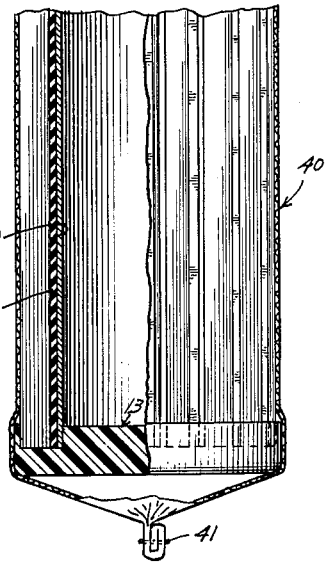
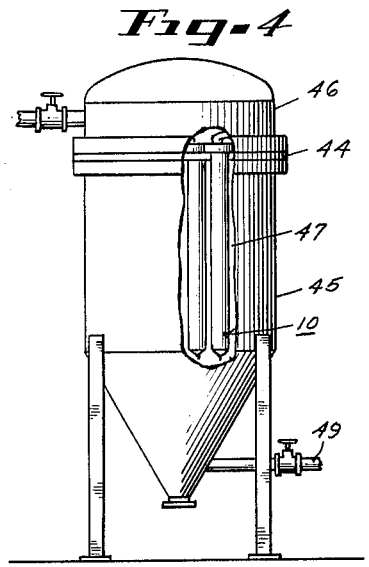
INVENTORS
James F. Zievers
Earl A. Borre
BY
Fidler, Beardsley & Bradley
ATTORNEYS

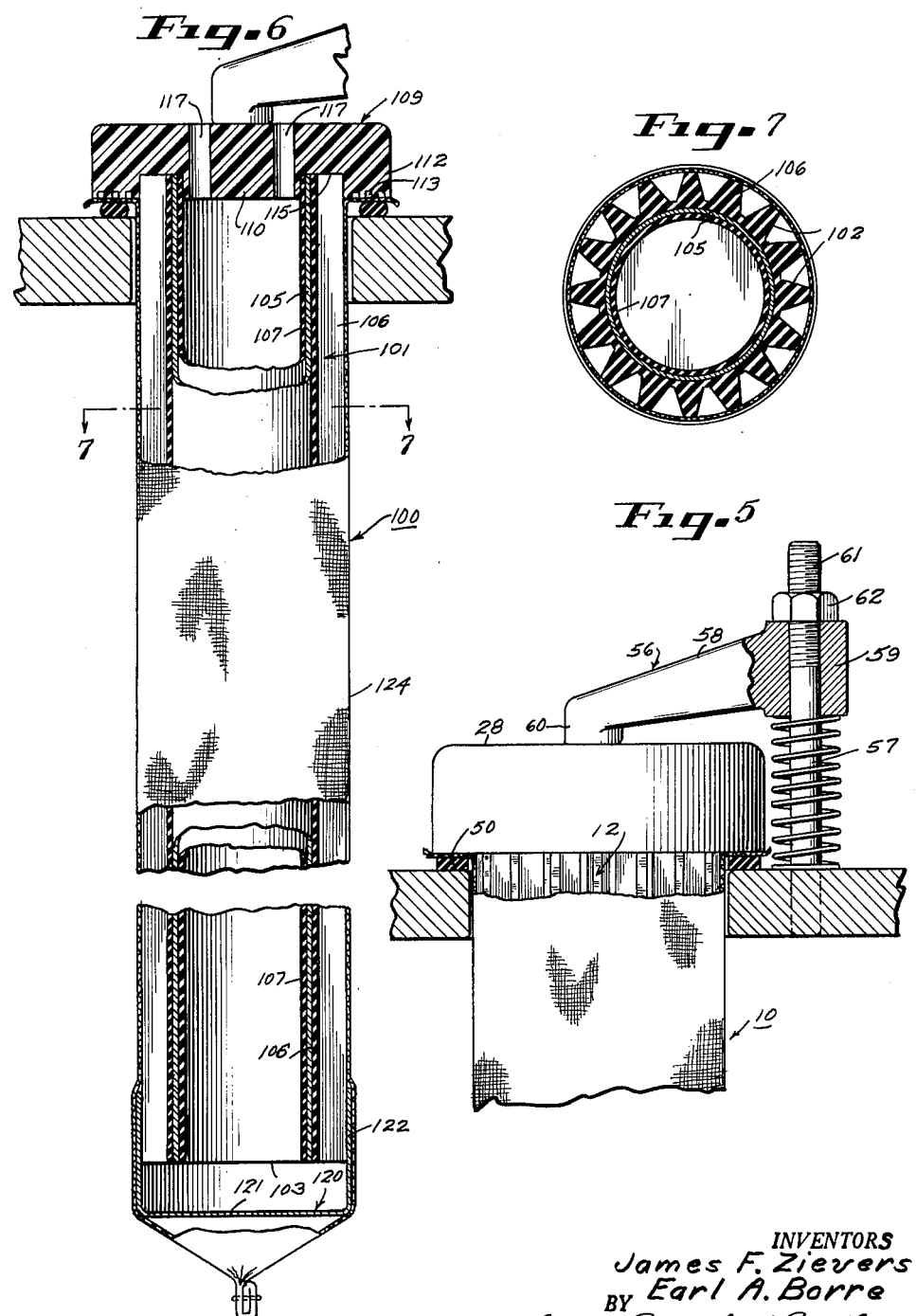

United States Patent Office 3,240,347
Patented Mar. 15, 1966

3,240,347
FILTER APPARATUS
James F. Zievers, La Grange, and Earl A. Borre, Itasca, Ill., assignors to Industrial Filter & Pump Mfg. Co., Cicero, Ill., a corporation of Illinois
Filed Jan. 22, 1962, Ser. No. 167,515
2 Claims. (Cl. 210—459)

The present invention generally relates to filtration apparatus, and it more particularly relates to tubular filter elements and to filters employing such filter elements, as well as to the method of making such elements.

In order to remove entrained solids from a liquid it is common practice to force the liquid under pressure through a porous filtering medium, the interstices of which are dimensionally smaller than the solid particles to be removed. Accordingly, the liquor which passes through the filter medium is clarified to the extent that entrained solids exceeding some given dimension have been removed. Various types of filter media are used for this purpose including, for example, filter cakes built upon filter leaves and filter tubes. In many applications where filters of this general type are employed, either the liquid, the entrained solids or both are highly corrosive and will attack most metals. Consequently, filters which handle these corrosive liquids must be made of materials which are not readily attacked by the liquids to be clarified. Stainless steel has, in the past, been used for this purpose, but with an appreciable increase in the cost of the filters.

The present invention is particularly concerned with filters of the type which employ tubular filter elements having perforate walls on which a filter cake is adapted to be deposited. Such filter tubes must be sufficiently strong and self-supporting to withstand extremely high pressure differentials across the walls thereof, and in many applications to withstand extremely high operating temperatures. Moreover, it is desirable that such tubes have a substantially long life, and since filters require periodic maintenance wherein the tubes are removed, filter tubes should be extremely sturdy so that when subjected to rough handling they will not be damaged. Another requirement of such filter tubes is that the cost thereof not be excessive. A large number of these tubes are commonly used in a single filter and if the cost of such tubes were excessive, then the cost of the over-all filter would not be competitive with other types of filters in spite of the operational advantages of a tube type filter.

Therefore, an object of the present invention is to provide a new and improved filter.

Another object of the present invention is to provide a new and improved filter element.

Still another object of the present invention is to provide a new and improved tubular filter element.

Further objects and advantages of the present invention and a better understanding thereof will be had by reference to the following detailed description taken in connection with the accompanying drawings in which:

FIG. 1 is a longitudinal sectional view of a tubular filter element embodying the present invention;

FIG. 2 is a top end view of the filter element of FIG. 1;

FIG. 3 is a sectional view taken along the line 3—3 of FIG. 1 assuming the entire filter tube to be shown therein.

FIG. 4 is a side elevational view partly broken away showing the manner in which the filter tube of FIG. 1 may be mounted in an associated filter;

FIG. 5 is a greatly enlarged, fragmentary, sectional view showing the manner in which the filter tube of FIG. 6 is mounted;

FIG. 6 is a sectional view of a filter tube embodying the present invention and adapted for cleaning in a blow-down operation; and FIG. 7 is a sectional view taken along the line 7—7 of FIG. 6.

Referring now to the drawings and particularly to FIG. 1 thereof, there is shown a tubular filter element 10 which is generally cylindrical in shape and has a plurality of longitudinally extending flutes or grooves 11 extending substantially throughout the length of a core member 12. The core member 12 is hollow throughout a substantial portion of its length and is sealably closed at the bottom by means of an imperforate plug 13 and at the top by means of an imperforate plug 15.

Considered in greater detail, the core member 12 should be relatively rigid and therefore comprises a reinforcing tube 19 formed of a rigid material such, for example, as metal, over which is provided an outer coating or sleeve 20, which is formed of a material not subject to attack by the materials with which the filter tube 10 is to be used. The coating 20 may, for example, be hard rubber or other suitable material, but as will become clearer as the description proceeds, is preferably an elastomeric material. Where the coating 20 comprises an elastomeric material, it is preferably assembled to the tube 19 by expanding the member 20 and slipping the tube 19 therein. The bottom plug 13 may be formed of any suitable material, but it has been found that a resin such as an epoxy is well suited for this purpose and when used the plug 13 may be molded or potted directly in place. The plug 15 has a body portion 21 which, as best shown in FIG. 3, is generally octagonal in shape, being provided with a plurality of flat surfaces 22, the purpose of which is to permit air to escape from the tube 19 when the plug 15 is pressed into place after the lower plug 13 has been assembled to the tube. The plug 15 has a frusto-conical upper portion 23, having a downwardly facing annular shoulder 24 which overlies the upper end of the reinforcing tube 19 and extends over only a small portion of the coating sleeve 20. The plug 15 may be cemented in place in the end of the tube 19 and is provided with a generally serrated upper end 26 provided by a plurality of concentric grooves 27. A cap 28 includes a wall 29 and a depending tubular portion 30 terimnating in a serrated shoulder 31 having a plurality of concentric grooves 32 therein. The internal diameter of the tubular portion 30 approximates the maximum external diameter of the core member 12 and the serrated surface 26 of the plug 15 abuts against the inner surface of the cap wall 29. The cap 28 is cemented both to the plug 15 and to the butting portion of the core member 12, and a plurality of concentric grooves 34 are provided in the interior cap wall 29 for improving the bond between the plug 15 and the cap 28. Inasmuch as the upper portion 23 of the plug 15 extends but a short distance over the coating sleeve 20, there is provided an annular chamber 36 which serves as a manifold chamber into which the grooves 11 all open. A plurailty of apertures 38 are provided in the end wall 29 of the cap 28 and open into the manifold chamber 36.

In use, a flexible, porous sleeve 40, which may be woven cloth or wire mesh and on which a filter cake is to be deposited, is disposed over the core member 12 and secured at the bottom beneath the cap 13 by means of a staple or other fastening device 41. The upper end 42 of the sleeve 40 extends a short distance over a tube sheet 44 which, as best shown in FIG. 4, is interconnected in a filter tank 45 between an upper dome chamber located in a cover member 46 and a lower chamber 47 in the tank 45. As is well known by those skilled in the art, the liquid to be clarified is supplied under pressure to the tank 45 through a suitable inlet 49, and it passes through the filter cakes deposited on each of the sleeves 40 of the filter tubes and along the grooves 11 to the manifold chamber 36 from which it passes into the dome chamber via the passageways 38.

In order to prevent the fluid from by-passing the filter tubes 10 a flat, resilient sealing gasket 50 is positioned between the cap shoulder 31 and the opposing surface of the tube sheet 44 which thus surrounds an aperture 52 through which the filter tube 10 depends. The sleeve 40 is held in place by virtue of the fact that the upper end thereof extends between the gasket 50 and the shoulder 31. As best shown in FIG. 5, a clamp 56, which is secured to the tube sheet by means of a stud 57, holds the filter tube tightly in place on the tube sheet 44 and maintains the gasket 50 in a compressed condition whereby the sleeve 40 cannot be separated from the core 12. The clamp 56 includes at least one arm 58 extending from a central hub portion 59 and a foot 60 which engages the cap 28 on the longitudinal axis of the tube 10 so that uniform pressure is exerted on the gasket 50. The upper end of the stud 57 is threaded, as shown at 61 and a nut 62 is threaded thereon to force the foot 60 tightly against the cap 28 to provide the necessary force to compress the gasket 50.

In order to fabricate the filter tube 10 shown in FIG. 1, the following procedure may be followed:

(1) The outside of the reinforcement tube 19 is roughened as by sandblasting or the like and a suitable cement, such as rubber cement, is sprayed, brushed or otherwise coated thereon.

(2) The sleeve 20 is extruded from hard rubber and partially cured.

(3) The partly cured sleeve is expanded and the reinforcement tube 19 is inserted into it.

(4) The sleeve 20 is permitted to retract whereby it tightly grips the reinforcing tube 19.

(5) The sleeve 20 is trimmed to the length of the reinforcement tube 19.

(6) With the tube 19 in place within the sleeve 20, the assembly is then cured a sufficient amount to securely bond tube 19 to the connecting sleeve 20. Preferably, this is not the final cure for the material of the sleeve 20.

(7) The plug 13 is then molded in place as by inserting the tube 19 and its coating sleeve 20 into a mold filled with an epoxy resin which is allowed to cure with the tube 13 in place.

(8) The plug 15 which is also preferably formed of an epoxy resin is then coated with cement and inserted into the upper end of the tube 19.

(9) The cap 28 is then cemented to the plug 15 and to the sleeve 20 and the entire unit is heated in the proper atmosphere to completely cure the sleeve 20.

The filter tube illustrated in FIG. 1 may be used in those applications in which a blow-down type of filter cake leaching operation is not required. Where, however, a blow-down operation is required, then the filter tube shown in FIGS. 6 and 7 may be used. A blow-down operation is one in which air is forced through the cake to expel liquid which is trapped therein.

Referring to FIGS. 6 and 7, there is shown a filter tube 100 comprising a core 101 having a plurality of longitudinally extending flutes 102 extending from the lower end 103 of the core to the upper end. Preferably, the core 101 should be rigid and thus comprises a reinforcing tube 105 formed of a suitably rigid material such as aluminum. Since metals such as aluminum are readily attacked by the liquids commonly filtered, there are provided an outer coating 106 and an inner lining or coating 107. The coatings 106 and 107 should be inert to the liquids to be filtered and may each be elastomeric sleeves which are tightly fitted and bonded to the reinforcing tube 105. A cap 109 is secured to the upper end of the core member 101 and includes a depending central boss 10 which extends a short distance into the tube. The cap 109 includes a depending tubular portion 112 having a downwardly facing serrated shoulder 113 and having an internal diameter approximating the maximum external diameter of the core member 101. The cap 109 thus includes an internally disposed annular groove 115 into which the core 101 is tightly fitted. A plurality of longitudinally extending apertures 117 extend through the cap 109 and connect to the cavity within the tube. Otherwise, the cap 109 is imperforate.

The lower end 103 of the core 101 is covered by a cup-like cap 120 having an imperforate bottom wall 121 and an imperforate tubular side wall 122. As shown in FIG. 5, the end 103 of the core terminates a substantial distance above the cap wall 121, whereby the grooves 102 in the core member communicate through the cap 122 with the central cavity in the core 101. The side wall 122 should extend up the side of the core member 101 only a sufficient distance to permit a fixed connection between the cap 120 and the core 101, which connection may be formed as by cementing or the like. A flexible, porous sleeve 124 is attached over the core 112 in the same manner as is the sleeve 40 attached to the core in the embodiment illustrated in FIG. 1.

In operation, a filter cake is deposited over the sleeve 124 and the clarified liquid which passes through the filter cake flows downwardly along the grooves 102 and through the cap 120 to the central cavity of the core member 101 from where it passes out of the tube into the dome chamber through the passageway 117 in the cap 109.

In those operations where the material from which the reinforcing tube 105 is not subject to attack, the liner 107 need not be used.

In order to fabricate the filter tube 100, the sleeve 102 is placed on the reinforcement tube 105 in the manner as described above in connection with the tube of FIG. 1. The inner liner 107 is extruded of an elastomeric material such, for example, as hard rubber and in the unstressed condition has an external diameter slightly less than the internal diameter of the reinforcement tube 105. The inner surface of the tube 105 is roughened and the outer surface of the tube 107 is then coated with a layer of cement. The tube 107 is then inserted into the tube 105 and expanded, as by air pressure, tightly against the tube 105 and held in this condition until the cement has sufficiently set to hold the liner 107 in place against the tube 105. The cap 109 is preferably cemented as described hereinabove onto the upper end of the core member and, in like manner, the cap 120 is cemented to the lower end of the core member.

While the present invention has been described in connection with certain embodiments thereof, it will be understood that those skilled in the art may make many changes and modifications without departing from the true spirit and scope of the invention. Therefore, it is intended by the claims which are appended hereto and which form a part of the present specification to cover all such changes and modifications which fall within the true spirit and scope of the present invention.

We claim:

1. A filter element for a filter tank including a tube sheet for operatively mounting a filter element depending therefrom, said filter element comprising a rigid tube having an upper end and a lower end, an elastomeric inner coating on the inner wall of said tube, an elastomeric outer coating on the outer wall of said tube, said outer coating including a plurality of flutes, each flute extending from one end thereof to the other, a bottom cap having an inperforate bottom wall and an imperforate tubular side wall, the lower end of said tube being received in said bottom cap in spaced relationship with said bottom wall, said outer coating being in engagement with said side wall of said bottom cap whereby said grooves communicate with the cavity in said tube through said bottom cap, a top cap secured to the upper end of said tube, said top cap having at least one aperture therethrough opening into said tube, said top cap provided with an annular recess, said flutes complementally formed to said annular recess and extending into said annular recess, a depending annular flange of said top cap overlying a small end portion of said tube and outer coating and providing a downwardly facing annular shoulder surrounding said outer coating, and said annular recess being disposed radially inwardly of the annular shoulder, a flexible porous sleeve disposed over said outer coating to provide a filter cake supporting medium, said sleeve including an upper, annular portion extending adjacent said annular shoulder above said tube sheet whereby said portion of said flexible porous sleeve is held between said annular shoulder and said tube sheet to retain said flexible porous sleeve on said tube.

2. A filter element for a filter tank including a tube sheet for operatively mounting a filter element depending therefrom, said filter element comprising a rigid tube having an upper end and a lower end, an elastomeric inner coating on the inner wall of said tube, an elastomeric outer coating on the outer wall of said tube, said outer coating including a plurality of flutes, each flute extending from one end thereof to the other, a bottom cap having an imperforate bottom wall and an imperforate tubular side wall, the lower end of said tube being received in said bottom cap in spaced relationship with said bottom wall, said outer coating being in engagement with said side wall of said bottom cap whereby said grooves communicate with the cavity in said tube through said bottom cap, a top cap secured to the upper end of said tube, said top cap having at least one aperture therethrough opening into said tube, said top cap provided with an annular recess, said flutes complementally formed to said annular recess and extending into said annular recess, a depending annular flange of said top cap overlying a small end portion of said tube and outer coating and providing a downwardly facing annular shoulder surrounding said outer coating and said annular recess being disposed radially inwardly of the annular shoulder, said annular shoulder including a serrated gripping surface, said annular portion of said flexible porous sleeve radially co-extensive with said serrated gripping surface for operatively retaining said flexible porous sleeve on said outer coating.

References Cited by the Examiner

UNITED STATES PATENTS

| 1,809,250 | 6/1931 | Pendleton | 285—206 |
| 1,969,796 | 8/1934 | Hoke | 85—32 X |

FOREIGN PATENTS 832,638   4/1960   Great Britain.

REUBEN FRIEDMAN, *Primary Examiner.*

HERBERT L. MARTIN, *Examiner.*